(12) United States Patent
Chavarria et al.

(10) Patent No.: US 10,848,467 B2
(45) Date of Patent: Nov. 24, 2020

(54) SYSTEMS AND METHODS FOR SECURING A LAPTOP COMPUTER DEVICE (71) Applicant: MASTERCARD INTERNATIONAL INCOPORATED, Purchase, NY (US)

(72) Inventors: Pedro Chavarria, New York, NY (US); John Mwangi, Jersey City, NJ (US); Gagan D. Singh, Fair Lawn, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 341 days.

(21) Appl. No.: 15/833,437

(22) Filed: Dec. 6, 2017

(65) Prior Publication Data
US 2019/0173852 A1 Jun. 6, 2019

(51) Int. Cl.
G06Q 20/00 (2012.01)
H04L 29/06 (2006.01)
G06Q 20/38 (2012.01)
H04L 9/32 (2006.01)

(52) U.S. Cl.
CPC ......... H04L 63/0428 (2013.01); G06Q 20/00 (2013.01); G06Q 20/3821 (2013.01); H04L 9/3234 (2013.01); H04L 9/3236 (2013.01)

(58) Field of Classification Search
CPC .......................... G06Q 20/00; G06Q 20/3821
USPC .......................................................... 705/44
See application file for complete search history.

(56) References Cited

U.S. PATENT DOCUMENTS

2010/0235284 A1 9/2010 Moore
2010/0235286 A1 9/2010 Moore
2013/0198551 A1* 8/2013 Marlin ................... G06Q 30/04
    713/340
2014/0164243 A1* 6/2014 Aabye .................. G06Q 20/027
    705/44
2014/0344153 A1* 11/2014 Raj ..................... G06Q 20/3223
    705/44
2015/0112870 A1* 4/2015 Nagasundaram .... G06Q 20/401
    705/67

(Continued)

FOREIGN PATENT DOCUMENTS

EP      2820601 A1    1/2015
EP      3217342 A1    9/2017

(Continued)

OTHER PUBLICATIONS

PCT International Search Report and Written Opinion, Application No. PCT/US2018/058661, dated Feb. 27, 2019, 12 pps.

*Primary Examiner* — Robert R Niquette
*Assistant Examiner* — Liz P Nguyen
(74) *Attorney, Agent, or Firm* — Armstrong Teasdale LLP (57) ABSTRACT

A method for securing a laptop computer device using a security management computing device includes receiving a request for a secure token, the request including (i) a device unique identifier associated with the laptop computer device, and (ii) a context unique identifier associated with a context of using the laptop computer device to initiate data communications. The method also includes generating a secure token associated with both the laptop computer device and the context of using the laptop computer device, such that the secure token is usable only within the context, and transmitting the secure token to the laptop computer device.

20 Claims, 6 Drawing Sheets

(56) References Cited

U.S. PATENT DOCUMENTS

| | | |
|---|---|---|
| 2016/0042341 A1* | 2/2016 | Griffin .................. H04L 67/02 705/44 |
| 2016/0321653 A1 | 11/2016 | Jacobs et al. |
| 2017/0039568 A1 | 2/2017 | Tunnell et al. |
| 2017/0222982 A1 | 8/2017 | Gosain et al. |

FOREIGN PATENT DOCUMENTS

| | | |
|---|---|---|
| WO | 2017106691 A1 | 6/2017 |
| WO | 2017127879 A1 | 8/2017 |

\* cited by examiner

SYSTEMS AND METHODS FOR SECURING A LAPTOP COMPUTER DEVICE

BACKGROUND

The field of the disclosure relates generally to systems and methods for computer device security and, more particularly, to systems and methods for securing a laptop computer device using a secure token unique to the laptop computer device.

E-commerce is a rapidly growing segment of the economy, as more and more consumers are making online purchases of goods and services using their personal computing devices (e.g., phones, laptops, etc.). Frequently, these online purchases are "card-not-present" (CNP) purchases, in which a user enters their payment information into one or more fields of an online form, and submits that payment information to a merchant to initiate a transaction. This payment information may be vulnerable to compromise, either at the merchant or during the transmission of transaction data (e.g., over public Wi-Fi where it can be captured without the user knowing). Other data communications may be similarly vulnerable, such as communication account information (e.g., passwords) or other user information (e.g., addresses) using web-based forms. At least some known systems provide a token for a consumer to use, wherein the token acts as a stand-in for sensitive information such as a payment account identifier. However, at least some known systems require a connection to a token provision service to access the token, such as a Wi-Fi or cellular data connection. Moreover, at least some known systems, such as those available on cellular phones, cannot provide a token to a web browser for use, for example, to make a purchase from a merchant on a merchant website accessed through the browser.

Accordingly, it is desirable to provide security for data transmissions, such as purchase transactions, conducted using personal computing devices such as laptops.

BRIEF DESCRIPTION

In one aspect, a method for securing a laptop computer device using a security management computing device is provided. The method includes receiving, from the laptop computer device, a request for a secure token. The request includes (i) a device unique identifier associated with the laptop computer device, and (ii) a context unique identifier associated with a context of using the laptop computer device to initiate data communications. The method also includes generating a secure token associated with both the laptop computer device and the context of using the laptop computer device, such that the secure token is usable only within the context, and transmitting the secure token to the laptop computer device.

In another aspect, a security management computing device for securing a laptop computer device is provided. The security management computing device includes a memory, and a processor in communication with the memory. The processor is programmed to receive, from the laptop computer device, a request for a secure token. The request includes (i) a device unique identifier associated with the laptop computer device, and (ii) a context unique identifier associated with a context of using the laptop computer device to initiate data communications. The processor is further programmed to generate a secure token associated with both the laptop computer device and the context of using the laptop computer device, such that the secure token is usable only within the context, and transmit the secure token to the laptop computer device.

In a further aspect, a method for securing a laptop computer device is provided. The method includes generating, by the laptop computer device, a request for a secure token. The request includes (i) a device unique identifier associated with the laptop computer device, and (ii) a context unique identifier associated with a context of using the laptop computer device to initiate data communications. The method also includes transmitting the request to a security management computing device, and receiving the secure token from the security management computing device, the secure token associated with both the laptop computer device and the context of using the laptop computer device, such that the secure token is usable only within the context. The method further includes storing the secure token within a memory device of the laptop computer device, and providing a web browser to facilitate the context of using the laptop computer device. In addition, the method includes receiving an access request from the web browser to access the secure token within the context of using the laptop computer device, and providing the secure token to the web browser.

In yet another aspect, a laptop computer device is provided. The laptop computer device includes a memory device, and a processor in communication with the memory device. The processor is programmed to generate a request for a secure token. The request includes (i) a device unique identifier associated with the laptop computer device, and (ii) a context unique identifier associated with a context of using the laptop computer device to initiate data communications. The processor is also programmed to transmit the request to a security management computing device, and receive the secure token from the security management computing device, the secure token associated with both the laptop computer device and the context of using the laptop computer device, such that the secure token is usable only within the context. The processor is further programmed to store the secure token within a secure memory area of the memory device, and provide a web browser to facilitate the context of using the laptop computer device. In addition, the processor is programmed to receive an access request from the web browser to access the secure token within the context of using the laptop computer device, and provide the secure token to the web browser.

BRIEF DESCRIPTION OF THE DRAWINGS

FIGS. 1-6 show exemplary embodiments of the devices and method described herein.

DETAILED DESCRIPTION

Embodiments of the present disclosure relate generally to improving the security of computer devices. More particularly, the present disclosure relates generally to securing a laptop computer device using a secure token unique to the laptop computer device. The laptop computer device may then use the secure token to ensure the security of data communications involving the laptop computer device. For instance, the laptop computer device may provide the secure token in an outgoing data transmission, and the secure token may be used to verify that the data transmission is from the laptop computer device and not a bad actor fraudulently transmitting the data.

The methods and systems described herein include a device security computing system that includes at least a security management computing device in communication with a laptop computer device. The laptop computer device includes a processor, a memory device configured to store a secure token, and a communication interface configured to facilitate communication of data including the secure token. The security management computing device includes one or more processors and a memory, which may include a centralized or non-centralized database. The security management computing device is configured to receive a request for the secure token from the laptop computer device and generate the secure token in response to the request, wherein the secure token is unique to the laptop computer device. The security management computing device may access the database and/or another memory device to store the secure token (and/or an encryption thereof) for future reference, namely, to verify data communications from the laptop computer device.

In one particular implementation, the laptop computer device has a unique identifier associated therewith, upon the manufacture of the laptop computer device. For instance, the laptop computer device may have a MAC address, a hardware address, an IP address, and/or any other unique identifier associated therewith. In some instances, this unique identifier, referred to herein as a "device unique identifier," is associated with or tied to one or more hardware components of the laptop, such as a processor, integrated circuit (IC), chip, a network interface controller (NIC), or another hardware component integral to the laptop computer device. In the example embodiment, this device unique identifier cannot be or is not easily changed, updated, or transferred.

The laptop computer device generates a request for a secure token and transmits the request to the security management computing device. In the example embodiment, the request includes the device unique identifier of the laptop computer device. The request further includes a context unique identifier, which is another unique identifier that is specific to the context of the request and the requested secure token. In other words, the context unique identifier is associated with the context of using the laptop computer device to initiate data communications. In one particular implementation, the context unique identifier includes a payment account identifier associated with a payment account of a user of the laptop computer device. The payment account identifier may include, for example, an account number, a payment card (e.g., credit card, debit card, pre-paid card) number, or a virtual payment account number (e.g., an encrypted or otherwise secured payment account number). Here, the context of the request and the requested secure token is to secure payment transactions initiated at the laptop computer device.

The security management computing device is configured to generate a secure token that at least partially includes and/or references both the device unique identifier and the context unique identifier. For instance, in one embodiment, the security management computing device appends a standardized version of the context unique identifier to a standardized version of the device unique identifier to generate a combined unique identifier. The security management computing device uses a hash function to obscure any personally identifiable information (PII) in the combined unique identifier, and the hash of the combined unique identifier may be used as the secure token. It should be readily understood that this process is only one example process of many that may be used to generate the secure token and should be not be construed to limit the present disclosure. The resulting secure token is not only unique to the laptop computer device but is unique to the context of the request. In some embodiments, the secure token functions as a replacement for the context unique identifier, such that the user of the laptop computer device need not provide PII or other sensitive information to a receiving party of data communications from the laptop computer device. In the particular implementation in which the context unique identifier includes a payment account identifier, the generated secure token replaces the PII of the context unique identifier, or the payment account identifier in this example. Accordingly, the user of the laptop computer device need not provide their payment account information to a merchant, where it could be vulnerable to compromise. Instead, the user provides the secure token.

In addition, as the secure token is tied to the device unique identifier as well, the secure token is limited to securing transactions initiated using that payment account from that laptop computer device. As such, not only does the secure token function to secure the user's data, but the secure token further provides an increased level of authentication to other parties to the data communication (e.g., the purchase transaction). The secure token can be compared to transaction data associated with the specific transaction to ensure that the transaction was made by the particular user (associated with the payment account) using the laptop computer device. Accordingly, one or more parties to the data communication (e.g., the transaction) may perform fewer authentication procedures, reducing latency of the data communication and reducing the processing capacity needed to process data communications.

The security management computing device returns the secure token to the laptop computer device. The laptop computer device stores the secure token in a memory thereof, specifically in a secure area of the memory that may be password-protected, encrypted, and/or otherwise more secure than another area of the memory. By storing the secure token in a secure area of the memory, the laptop computer device need not have access to a cloud or other dynamic providers of tokens. Rather, the laptop computer device can access the secure token at any time.

The laptop computer device is further configured to provide a web browser to a user of the laptop computer device. The web browser enables the user to access the Internet, such as various websites or webpages provided by merchants or other third-parties. In one particular implementation, the user uses the web browser to navigate to a merchant webpage at which the user wishes to initiate a purchase transaction. The web browser accesses, retrieves, or requests access to the secure token to initiate the purchase transaction. In some embodiments, the web browser includes a plug-in, or supplemental downloadable software that provides additional functionality to the active browser. In these embodiments, the plug-in enables the web browser to access the secure token from the secure memory and/or transmit a request for such access to the secure token. In some cases, the plug-in may request user authentication from the user before accessing the secure token. For instance, the plug-in may request that the user provide a password (e.g., a static password or one-time password) or biometric sample (e.g., a fingerprint, retinal scan, facial image, etc.). The user authentication may further secure the purchase transaction, as the user authentication provides an additional authentication element that the user of the laptop computer device is a "legitimate" user or a user that is legitimately associated with the payment account. The plug-in may enable the user to use multiple forms of user authentication and/or may enable multiple versions of a single form of user authentication such that multiple users may access the secure token (e.g., more than one password, more than one acceptable fingerprint, etc.). In other embodiments, the laptop computer device may provide an Application Programming Interface (API) that facilitates access to the secure token by the web browser. In such embodiment, the API may prompt user authentication from the user in much the same way as described above with respect to the plug-in. The API may facilitate automatic updating of functionality and/or other information, whereas the plug-in may, in some cases, be manually updated.

In response to the access request from the web browser, the laptop computer device provides the secure token to the web browser. In particular, the laptop computer device may populate one or more text fields in the web browser with at least a portion of the secure token. The secure token is then transmitted in an outgoing data transmission from the laptop computer device. For instance, the secure token is transmitted along with other transaction data to a merchant computer device to initiate a purchase transaction, using the secure token rather than sensitive payment account information. The transaction data may further include, for example, device information associated with the laptop computer device (e.g., the unique identifier, an IP address, a geolocation of the laptop computer device, etc.), user information (e.g., shipping address, loyalty information, log-in information input by the user to access one or more "member" features of the merchant's webpage, etc.), user authentication information (e.g., details of the user authentication described above and/or any samples or passwords provided by the user), and/or any other information.

This transaction data may be used by the merchant, an issuer of the payment account, and/or a payment processor to proceed with the transaction, including authorization and/or authentication processes. In particular, the payment processor, which includes the security management computing device in some embodiments, and/or the issuer compares the secure token to a stored version of the secure token. In addition, the payment processor and/or the issuer may confirm that the transaction data is sufficiently associated with the secure token. For example, the payment processor and/or the issuer may confirm that the device information matches or is associated with (i) the device unique identifier portion of the secure token and/or (ii) the device unique identifier used to generate the secure token. The payment processor and/or the issuer may replace the secure token with associated payment account information to complete the transaction on the issuer side, such that the merchant need not ever have access to the payment account information.

Thus, the secure token functions to secure data communications, such as purchase transactions, initiated at the laptop computer device. The parties to the communication can use the secure token and other data within the communication to ensure that the communication originated at the laptop computer device (and not another, unsecured or unknown device) and is associated with an authentic or "true" user of the laptop computer device. The secure token may facilitate one or more parties to the communication, such as a purchase transaction, to perform fewer authentication procedures on the transactions, as the secure token provides an "up-front" authentication of the source of the transaction (i.e., as being performed at the laptop computer device).

In some embodiments, one or more parties to the data communication may perform one or more additional authentication processes to authenticate the secure token. For instance, in the case of a purchase transaction, the issuer may transmit a one-time password to the user associated with the payment account obscured by the secure token. This user may need to enter the one-time password into the web browser or into another interface (e.g., an issuer portal interface on their phone or other user computer device) in order for the secure token to be authenticated and for the purchase transaction to proceed. Accordingly, if someone else is attempting to use the laptop computer device and the secure token, that bad actor will not have access to the one-time password and will be unable to complete the purchase transaction.

While the systems and methods are broadly described herein, it should be understood that certain embodiments of the disclosure may include additional, less, and/or alternative steps, elements, and/or functionality.

For example, in certain embodiments, the security management computing device is configured to perform one or more authentication processes before generating the secure token. The security management computing device authenticates the request for the secure token by identifying another party associated with the laptop computer device and/or the payment account identifier (or other context identifier) of the request and notifying that party of the request. For instance, the security management computing device may identify an issuer of the payment account. The security management computing device may further cause the issuer to request confirmation of the authenticity of the request for the secure token from a user of the payment account (which should, ostensibly, be the user that generated the request using the laptop computer device, or a user associated therewith). In one particular embodiment, the security management computing device may transmit a notification to the laptop computer device of the authentication. In response, the laptop computer device may provide a prompt to a user of the laptop computer device to enter an authentication element (e.g., a code, a one-time password, etc.).

The security management computing device may transmit a control message to the issuer, the control message including instructions causing the issuer to generate and transmit a verification request to a user of the payment account, the verification request including an authentication element. For example, the control message may cause the issuer to generate and transmit a verification message (e.g., as an email message or text message) to the user, the verification message including an authentication element formatted as an alphanumeric verification code. The user may enter the authentication element into the laptop computer device (e.g., within a text field of an authentication prompt). When the laptop computer device receives the authentication element, the request for the secure token may be considered authenticated. The laptop computer device transmits the received authentication element to the security management computing device, and the security management computing device may generate the secure token. In some alternative embodiments, the security management computing device may have access to contact information for the user, and accordingly may be configured to transmit the verification message directly to the user (e.g., without the issuer).

The methods and systems described herein may be implemented using computer programming or engineering techniques including computer software, firmware, hardware or any combination or subset thereof, wherein the technical effects may be achieved by performing at least one of the following steps: (a) receiving a request for a secure token, the request including (i) a device unique identifier associated with the laptop computer device, and (ii) a context unique identifier associated with a context of using the laptop computer device to initiate data communications; (b) generating a secure token associated with both the laptop computer device and the context of using the laptop computer device, such that the secure token is usable only within the context; and/or (c) transmitting the secure token to the laptop computer device. The technical effects may be additionally or alternatively achieved by performing at least one of the following steps: (d) generating a request for a secure token, the request including (i) a device unique identifier associated with the laptop computer device, and (ii) a context unique identifier associated with a context of using the laptop computer device to initiate data communications; (e) transmitting the request to a security management computing device; (f) receiving the secure token from the security management computing device, the secure token associated with both the laptop computer device and the context of using the laptop computer device, such that the secure token is usable only within the context; (g) storing the secure token within a memory device of the laptop computer device; (h) providing a web browser to facilitate the context of using the laptop computer device; (i) receiving an access request from the web browser to access the secure token within the context of using the laptop computer device; and (j) providing the secure token to the web browser.

The technical benefits achieved by the methods and systems described herein include: (a) improving the security of data communications initiated using a laptop computer device, (b) providing such security without the need for a connection to a cloud token service, (c) reducing authentication procedures for data communications, such as purchase transactions, initiated using the secured laptop computer device, thereby (d) reducing processing time for data communications, such as purchase transactions.

Further, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an exemplary embodiment, the system is executed on a single computer system, without requiring a connection to a sever computer. In a further exemplary embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The system is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to processing financial transaction data by a third party in a variety of applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

Figure 1:
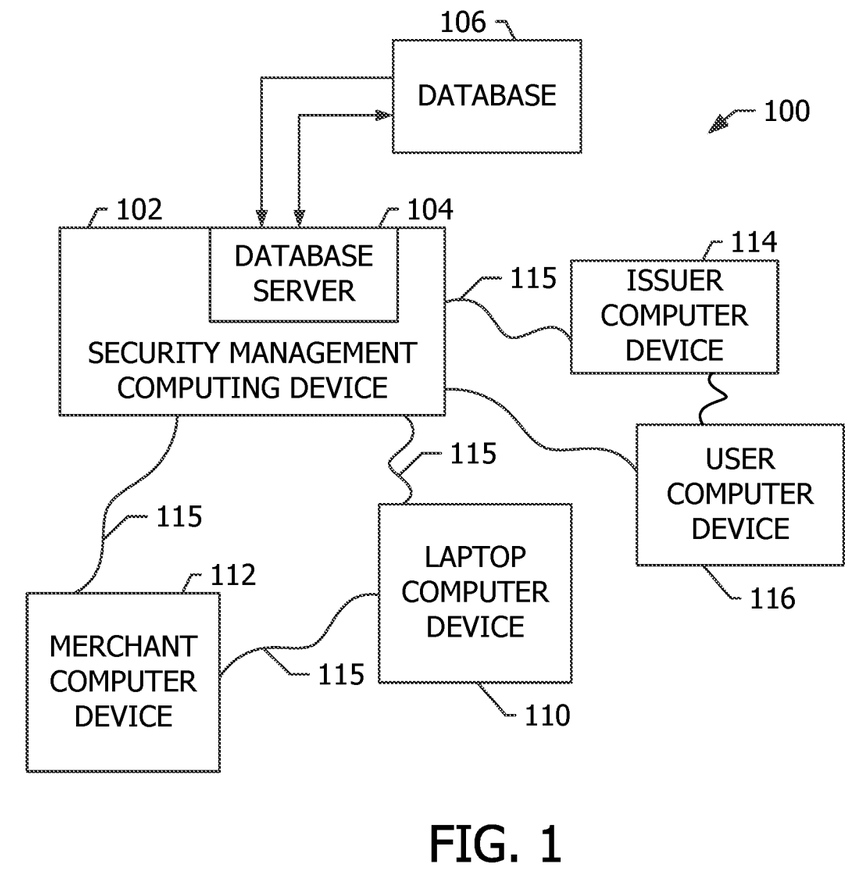
FIG. 1 is a simplified block diagram of an exemplary device security computing system for securing laptop computer devices using secure tokens.

FIG. 1 is a simplified block diagram of an exemplary device security computer system 100 including a plurality of computer devices in accordance with one embodiment of the present disclosure. In the example embodiment, device security computer system 100 may be used for securing a laptop computer device 110, specifically securing data communications from laptop computer device 110 with a secure token.

More specifically, device security computing system 100 includes a security management computing device 102, and laptop computer device 110. Although only one laptop computer device 110 is shown for clarity, it should be readily understood that device security computing system 100 may include any number of laptop computer devices 110. In the example embodiment, security management computing device 102 is associated with an entity that provides data security, such as secure tokens. In some embodiments, security management computing device 102 is associated with a payment processing network system (e.g., MASTERCARD®, VISA®, etc.). Specifically, security management computing device 102 may be integral to or in communication with a payment processor configured to process payment transactions (e.g., purchase transactions, P2P payments, etc.). Laptop computer device 110 may be a laptop computer, such as those manufactured by DELL®, APPLE®, SAMSUNG®, TOSHIBA®, etc., the laptop computer including a web browser, such that security management computing device 102 (and/or one or more other computer devices) is accessible to laptop computer device 110 using the Internet. Laptop computer device 110 (and/or any other computing device shown in FIG. 1) is interconnected to the Internet through many interfaces including a network 115, such as a local area network (LAN) or a wide area network (WAN), dial-in-connections, cable modems, and special high-speed Integrated Services Digital Network (ISDN) lines. In some embodiments, laptop computer device 110 may further include, for example, a desktop computer.

In the illustrated embodiment, laptop computer device 110 and/or security management computing device 102 are further in communication with one or more of a merchant computer device 112 (associated with a merchant offering goods and/or services for sale, specifically via one or more website or webpages accessible via the Internet), an issuer computer device 114 (associated with an issuer of a payment account used to make purchases, for example, from the merchant of merchant computing device 112), and/or a user computer device 116 (associated with a user of laptop computer device 110). User computer device 116 may include, for example, a web-based phone, a tablet, a "phablet," a web-connected wearable device, a "smart home"/Internet of Things interface/hub device, a desktop computer, another laptop computer device, and/or any other user computer device.

A database server 104 is connected to a database 106, which contains information on a variety of matters, including secure tokens, device unique identifiers, context unique identifiers (e.g., payment account identifiers), user contact information, transaction data, and/or any other information, including that described herein. In one embodiment, centralized database 106 is stored on security management computing device 102. In an alternative embodiment, database 106 is stored remotely from security management computing device 102 and may be non-centralized. Database 106 may include a single database having separated sections or partitions or may include multiple databases, each being separate from each other.

In the example embodiment, laptop computer device 110 requests a secure token from security management computing device 102. For example, a user of laptop computer device 110 may initiate a process to request the secure token. Laptop computer device 110 transmits a request for the secure token to security management computing device 102, the request including (i) a device unique identifier associated with laptop computer device 110 itself, and (ii) a context unique identifier associated with a context for using laptop computer device 110 to initiate data communication (e.g., a payment account identifier, wherein the context includes using laptop computer device 110 to initiate purchase transactions).

In response to receiving the request, security management computing device 102 generates the secure token using the device unique identifier and the context unique identifier. The secure token functions to ensure that data communications from laptop computer device 110 are securely associated with laptop computer device 110, obscuring PII and/or sensitive information transmitted using laptop computer device 110 and reducing the need for authentication/verification procedures performed by parties in communication with laptop computer device (e.g., merchant computer device 112, issuer computer device 114). In some embodiments, before generating the secure token, security management computing device 102 may request user authentication data (e.g., a verification code, a password, biometric data, etc.) from the user of laptop computer device 110. Once user authentication data has been collected and authenticated, in some cases using issuer computer device 114 and/or user computer device 116, laptop computer device 110 notifies security management computing device 102 that user authentication was successful. Security management computing device 102 then generates the secure token and transmits the secure token data to laptop computer device 110.

Laptop computer device 110 stores the secure token in a memory device such that the secure token is always accessible for use by laptop computer device 110 without connection to another computing device. Laptop computer device 110 is configured to provide the secure token with at least some outgoing data transmissions. The secure token authenticates the data transmission as being transmitted from laptop computer device 110 within the context of the secure token (e.g., as part of a purchase transaction). In some cases, the secure token replaces the context unique identifier to prevent unnecessary proliferation of PII and/or sensitive information. In one implementation, a web browser provided by laptop computer device 110 accesses a webpage at which outgoing data transmission may be initiated (e.g., an online merchant webpage). The browser accesses, retrieves, or requests the secure token via a plug-in or an API from the memory of laptop computer device 110. The secure token may then be included in any outgoing data transmission initiated at a webpage accessed through the web browser.

Figure 2:
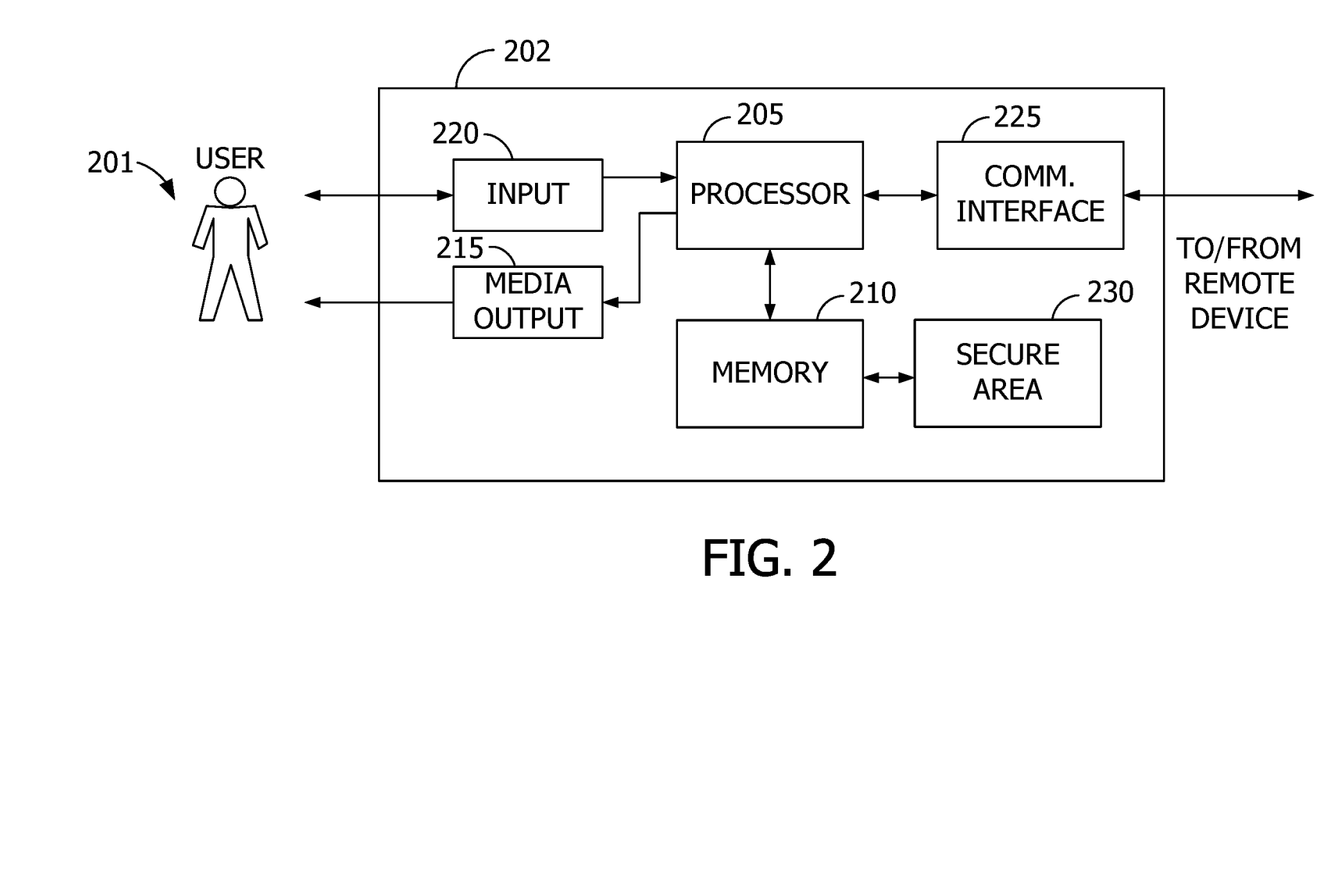
FIG. 2 illustrates an exemplary configuration of a user system such as a laptop computer device that may be used in the device security computing system shown in FIG. 1.

FIG. 2 illustrates an exemplary configuration of a user system 202 operated by a user 201. User system 202 may include, but is not limited to, laptop computer device 110 and/or user computer device 116 (both shown in FIG. 1). In the exemplary embodiment, user system 202 includes a processor 205 for executing instructions. In some embodiments, executable instructions are stored in a memory area.

Processor 205 may include one or more processing units, for example, a multi-core configuration. Memory area 210 is any device allowing information such as executable instructions and/or written works to be stored and retrieved. Memory area 210 may include one or more computer readable media. Memory area 210 includes and/or is communicatively coupled to a secure memory area 230 that is encrypted, password-protected, and/or other more secure than other portions of memory area 210.

User system 202 also includes at least one media output component 215 for presenting information to user 201.

Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as security management computing device 102. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WI-MAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from a server such as merchant computer device 112 (shown in FIG. 1). A client application allows user 201 to interact with a server application.

Figure 3:
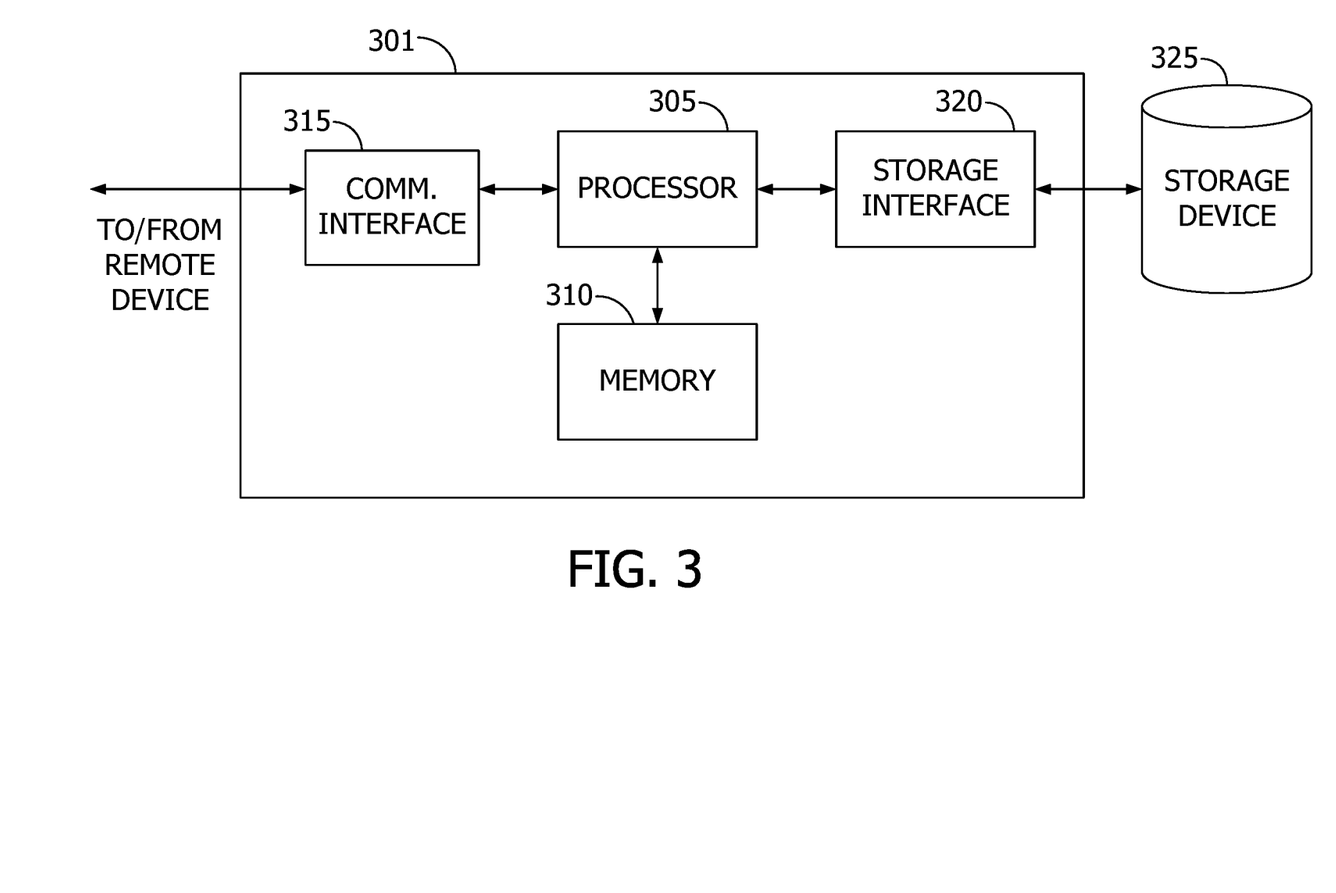
FIG. 3 illustrates an exemplary configuration of a server system that may be used in the device security computing system shown in FIG. 1.

FIG. 3 illustrates an exemplary configuration of a server system 301, such as security management computing device 102, merchant computer device 112, and/or issuer computer device 114 (all shown in FIG. 1). Server system 301 may include, but is not limited to, a database server, an application server, and/or a web server.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C #, C++, Java, or other suitable programming languages, etc.).

Processor 305 is operatively coupled to a communication interface 315 such that server system 301 is capable of communicating with a remote device such as a user system 202 (shown in FIG. 2) or another server system 301. For example, communication interface 315 may receive requests from laptop computer device 110 via the Internet, as illustrated in FIG. 1.

Processor 305 may also be operatively coupled to a storage device 325. Storage device 325 is any computer-operated hardware suitable for storing and/or retrieving data. In some embodiments, storage device 325 is integrated in server system 301. For example, server system 301 may include one or more hard disk drives as storage device 325. In other embodiments, storage device 325 is external to server system 301 and may be accessed by a plurality of server systems 301. For example, storage device 325 may include multiple storage units such as hard disks or solid state disks in a redundant array of inexpensive disks (RAID) configuration. Storage device 325 may include a storage area network (SAN) and/or a network attached storage (NAS) system.

In some embodiments, processor 305 is operatively coupled to storage device 325 via a storage interface 320. Storage interface 320 is any component capable of providing processor 305 with access to storage device 325. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 325.

Memory area 310 and/or memory area 210 (shown in FIG. 2) may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 4:
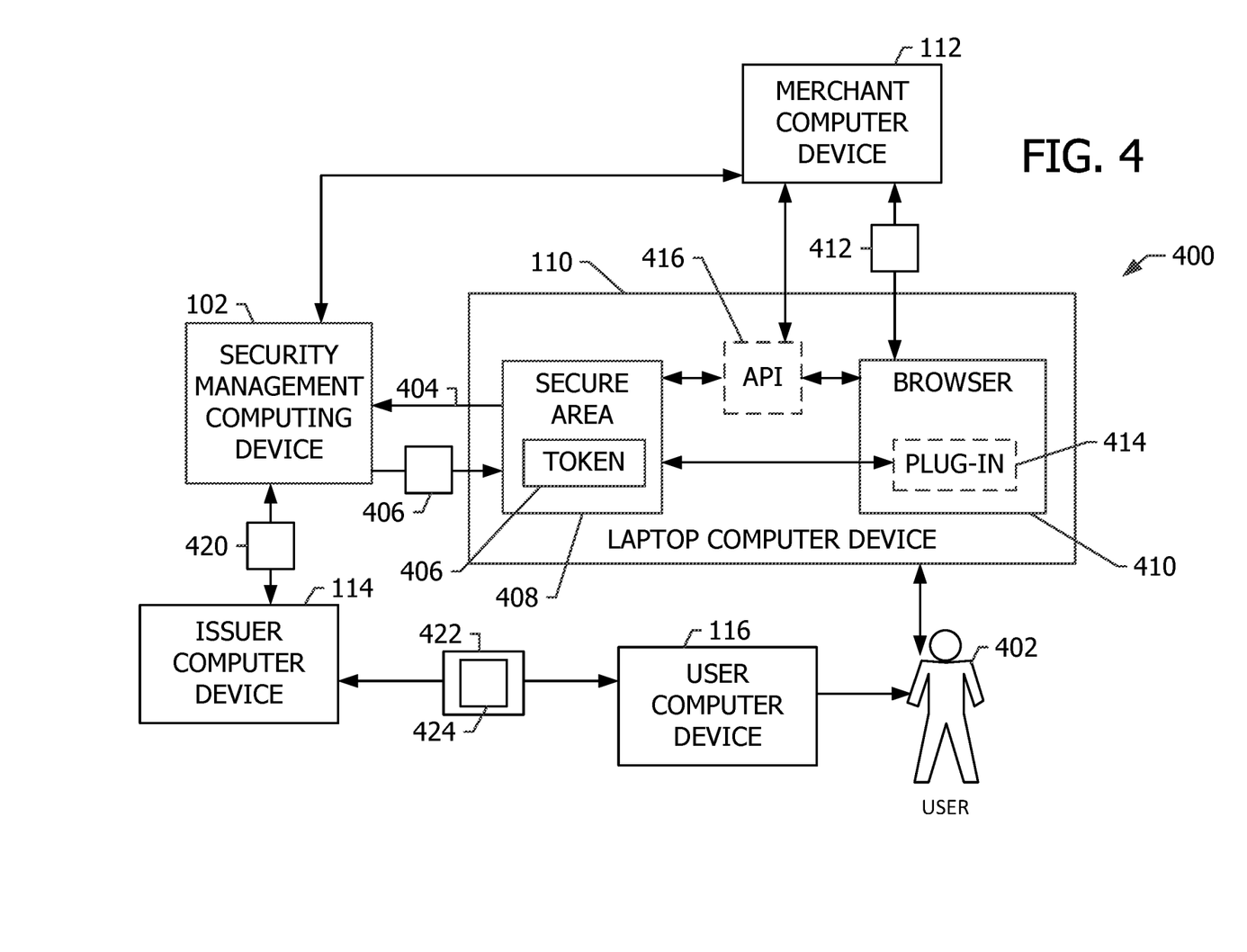
FIG. 4 illustrates an exemplary configuration of a laptop computer device in communication with a security management computing device and a merchant computing device, in accordance with an exemplary embodiment of the present disclosure.

FIG. 4 illustrates an exemplary configuration 400 of a laptop computer device 110 in communication with a security management computing device 102 (both shown in FIG. 1), in accordance with an exemplary embodiment of the present disclosure. In the illustrated embodiment, laptop computer device 110 is also communicatively coupled to a merchant computer device 112 and is further in communication with a user 402, who is a user of laptop computer device 110.

In one particular implementation, laptop computer device 110 has a unique identifier associated therewith, upon manufacture of laptop computer device 110. For instance, laptop computer device 110 may have a MAC address, a hardware address, an IP address (e.g., a static IP address), and/or any other unique identifier associated therewith. In some instances, this device unique identifier is associated with or tied to one or more hardware components of laptop computer device 110, such as a processor, integrated circuit (IC), chip, a network interface controller (NIC), or another hardware component integral to laptop computer device 110. In the example embodiment, this device unique identifier cannot be or is not easily changed, updated, or transferred.

Laptop computer device 110 generates a request 404 for a secure token 406 and transmits request 404 to security management computing device 102. In the example embodiment, request 404 includes the device unique identifier of laptop computer device 110. Request 404 further includes a context unique identifier, which is another unique identifier that is specific to the context of request 404 and the requested secure token 406 (e.g., the context of using laptop computer device 110 to transmit data). In one particular implementation, the context unique identifier includes a payment account identifier associated with a payment account of user 402 of laptop computer device 110. The payment account identifier may include, for example, an account number, a payment card (e.g., credit card, debit card, pre-paid card) number, or a virtual payment account number (e.g., an encrypted or otherwise secured payment account number). In this implementation, as illustrated in FIG. 4, the context of request 404 and the requested secure token 406 is to secure payment transactions initiated at laptop computer device 110.

Security management computing device 102 is configured to generate secure token 406, where secure token 406 at least partially includes and/or references both the device unique identifier and the context unique identifier. For instance, in one embodiment, security management computing device 102 appends a standardized version of the context unique identifier to a standardized version of the device unique identifier to generate a combined unique identifier. Security management computing device 102 uses a hash function to obscure any PII in the combined unique identifier, and the hash of the combined unique identifier may be used as secure token 406. It should be readily understood that this process is only one example process of many that may be used to generate secure token 406 and should be not be construed to limit the present disclosure. The resulting secure token 406 is not only unique to laptop computer device 110 but is unique to the context of request 404. In some embodiments, secure token 406 functions as a replacement for the context unique identifier, such that user 402 of laptop computer device 110 need not provide PII or other sensitive information to a receiving party of data communications from laptop computer device 110 (e.g., merchant computer device 112). In the particular implementation in which the context unique identifier includes a payment account identifier, the generated secure token 406 replaces the PII of the context unique identifier, or the payment account identifier in this example. Accordingly, user 402 of laptop computer device 110 need not provide their payment account information to merchant computer device 112, where it could be vulnerable to compromise. Instead, user 402 provides secure token 406.

In addition, as secure token 406 is tied to the device unique identifier as well, secure token 406 is limited to securing transactions initiated using that payment account from laptop computer device 110. As such, not only does secure token 406 function to secure the user's data, but secure token 406 further provides an increased level of authentication to other parties to the data communication (e.g., the purchase transaction). Secure token 406 can be compared to transaction data (e.g., transaction data 412, described further herein) associated with the specific transaction to ensure that the transaction was made by the particular user 402 (associated with the payment account) using laptop computer device 110. Accordingly, one or more parties to the data communication (e.g., the transaction) may perform fewer authentication procedures, reducing latency of the data communication and reducing the processing capacity needed to process data communications.

Security management computing device 102 returns secure token 406 to laptop computer device 110. Laptop computer device 110 stores secure token 406 in a memory thereof, specifically in a secure area 408 (which may be the same as or similar to secure area 230 of memory area 210 shown in FIG. 2) of the memory that may be password-protected, encrypted, and/or otherwise more secure than another area of the memory. By storing secure token 406 in secure area 408, laptop computer device 110 need not have access to a cloud or other dynamic providers of tokens. Rather, laptop computer device 110 can access secure token 406 at any time without additional network connections.

In the illustrated embodiment, security management computing device 102 is configured to perform one or more authentication processes before generating secure token 406. For example, security management computing device 102 authenticates request 404 by identifying another party associated with laptop computer device 110 and/or the payment account identifier (or other context identifier) of request 404 and notifying that party of request 404. For instance, security management computing device 102 may identify an issuer of the payment account (e.g., an issuer associated with issuer computer device 114). Security management computing device 102 may further cause the issuer to request confirmation of the authenticity of request 404 from user 402. In one particular embodiment, security management computing device 102 may transmit a control message 420 to issuer computer device 114, control message 420 including instructions causing issuer computer device 114 to generate and transmit a verification request 422 to user 402. Verification request 422 includes an authentication element 424. For example, control message 420 may cause issuer computer device 114 to generate and transmit a verification request message 422 (e.g., as an email message or text message) to user 402, verification request message 422 including an authentication element 424 formatted as an alphanumeric verification code. User 402 may enter authentication element 424 into laptop computer device 110 (e.g., within a text field of an authentication prompt). When laptop computer device 110 receives authentication element 424 from user 402, request 404 may be considered to be authenticated. Laptop computer device 110 transmits authentication element 424 and/or an indication of the authentication to security management computing device 102, and security management computing device 102 may generate secure token 406. In some alternative embodiments, security management computing device 102 may have access to contact information for user 402, and accordingly may be configured to transmit verification request message 422 directly to user 402 (e.g., without issuer computer device 114).

Laptop computer device 110 is further configured to provide a web browser 410 to user 402. Browser 410 enables user 402 to access the Internet, such as various websites or webpages provided by merchant computer device 112 or other third-parties. In one particular implementation, user 402 uses browser 410 to navigate to a merchant webpage provided by merchant computer device 112. User 402 may wish to initiate a purchase transaction at that webpage using browser 410.

Browser 410 accesses, retrieves, or requests access to secure token 406 to initiate the purchase transaction. In some embodiments, browser 410 includes a plug-in 414, or supplemental downloadable software that provides additional functionality to browser 410. In these embodiments, plug-in 414 enables browser 410 to access secure token 406 from secure memory area 408 and/or transmit a request for such access to secure token 406 (an "access request"). In some cases, plug-in 414 may request user authentication from user 402 before accessing/providing secure token 406, such as a password (e.g., static password or one-time password) or biometric sample (e.g., a fingerprint, retinal scan, facial image, etc.). The user authentication may further secure the purchase transaction, as the user authentication provides an additional authentication element that user 402 of laptop computer device 110 is a "legitimate" user or a user that is legitimately associated with the payment account. Plug-in 414 may enable user 402 to use multiple forms of user authentication and/or may enable multiple versions of a single form of user authentication such that multiple users 402 may access secure token 406 (e.g., more than one password, more than one acceptable fingerprint, etc.). In other embodiments, laptop computer device 110 may provide an Application Programming Interface (API) 416 that facilitates access to secure token 406 by browser 410. In such embodiment, API 416 may prompt user authentication from user 402 in much the same way as described above with respect to plug-in 414. API 416 may facilitate automatic updating of functionality and/or other information, whereas plug-in 414 may, in some cases, be manually updated. In some embodiments, API 416 may facilitate providing secure token 406 directly to merchant computer device 112.

In response to the access request from browser 410, laptop computer device 110 provides secure token 406 to browser 410. In particular, laptop computer device 110 may populate one or more text fields of the active webpage in browser 410 with at least a portion of secure token 406. Secure token 406 is then transmitted in an outgoing data transmission from laptop computer device 110. For instance, secure token 406 is transmitted in transaction data to merchant computer device 112 to initiate a purchase transaction, using secure token 406 rather than sensitive payment account information. Transaction data 412 may include, for example, device information associated with laptop computer device 110 (e.g., the unique identifier, an IP address, a geolocation of laptop computer device 110, etc.), user information (e.g., shipping information, loyalty information, log-in information input by user 402 to access one or more "member" features of the merchant's webpage, etc.), user authentication information (e.g., details of the user authentication described above and/or any samples or passwords provided by user 402), and/or any other information. Transaction data 412 may be used by merchant computer device 112, an issuer of the payment account (e.g., issuer computer device 114), and/or a payment processor to proceed with the transaction, including authorization and/or authentication processes. In particular, the payment processor, which includes security management computing device 102 in some embodiments, and/or the issuer compares secure token 406 to a stored version of secure token 406. For instance, security management computing device 102 may store the version of secure token 406 after generating secure token 406 and/or may transmit a copy of secure token 406 to other computing devices, such as issuer computer device 114. In addition, the payment processor and/or the issuer may confirm that transaction data 412 is sufficiently associated with secure token 406. For example, the payment processor and/or the issuer may confirm that the device information matches or is associated with (i) the device unique identifier portion of secure token 406 and/or (ii) the device unique identifier used to generate secure token 406. The payment processor and/or the issuer may replace secure token 406 with associated payment account information to complete the transaction on the issuer side, such that merchant computer device 112 need not ever have access to the payment account information.

In some embodiments, one or more parties to the data communication may perform one or more additional authentication processes to authenticate secure token 406. For instance, in the case of a purchase transaction, issuer computer device 114 may transmit a one-time password to user 402 (wherein user 402 is associated with the payment account obscured by secure token 406). User 402 may need to enter the one-time password into browser 410 or into another interface (e.g., an issuer portal interface on user computer device 116) in order for secure token 406 to be authenticated and for the purchase transaction to proceed. Accordingly, if someone else is attempting to use laptop computer device 110 and secure token 406, that bad actor will not have access to the one-time password and will be unable to complete the purchase transaction.

Figure 5:
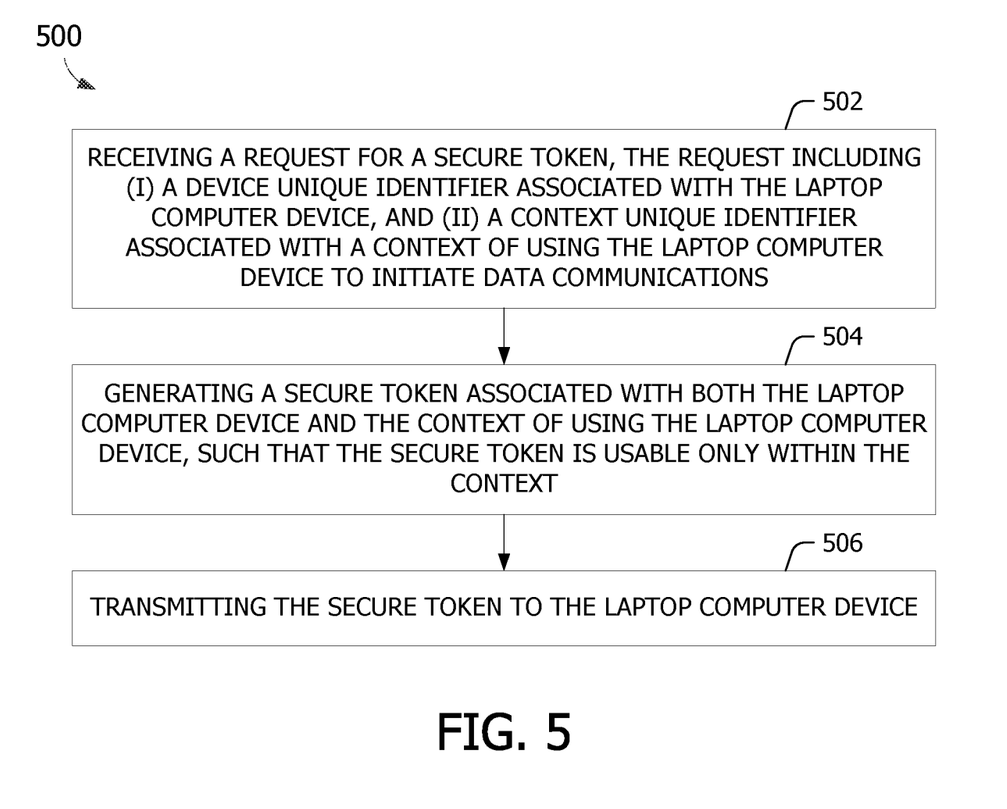
FIG. 5 is a flow diagram of a method for securing a laptop computer device using the system shown in FIG. 1.

FIG. 5 is a flow diagram of a method 500 for securing a laptop computer device, such as laptop computer device 110 (shown in FIG. 1). Method 500 is implemented using device security computer system 100, specifically using security management computing device 102 (both shown in FIG. 1).

In the illustrated embodiment, method 500 includes receiving 502 a request for a secure token, the request including (i) a device unique identifier associated with the laptop computer device, and (ii) a context unique identifier associated with a context of using the laptop computer device to initiate data communications. Method 500 further includes generating 504 a secure token associated with both the laptop computer device and the context of using the laptop computer device, such that the secure token is usable only within the context. Method 500 also include transmitting 506 the secure token to the laptop computer device. It should be readily understood that method 500 may include additional, fewer, and/or alternative steps in one or more embodiments.

Figure 6:
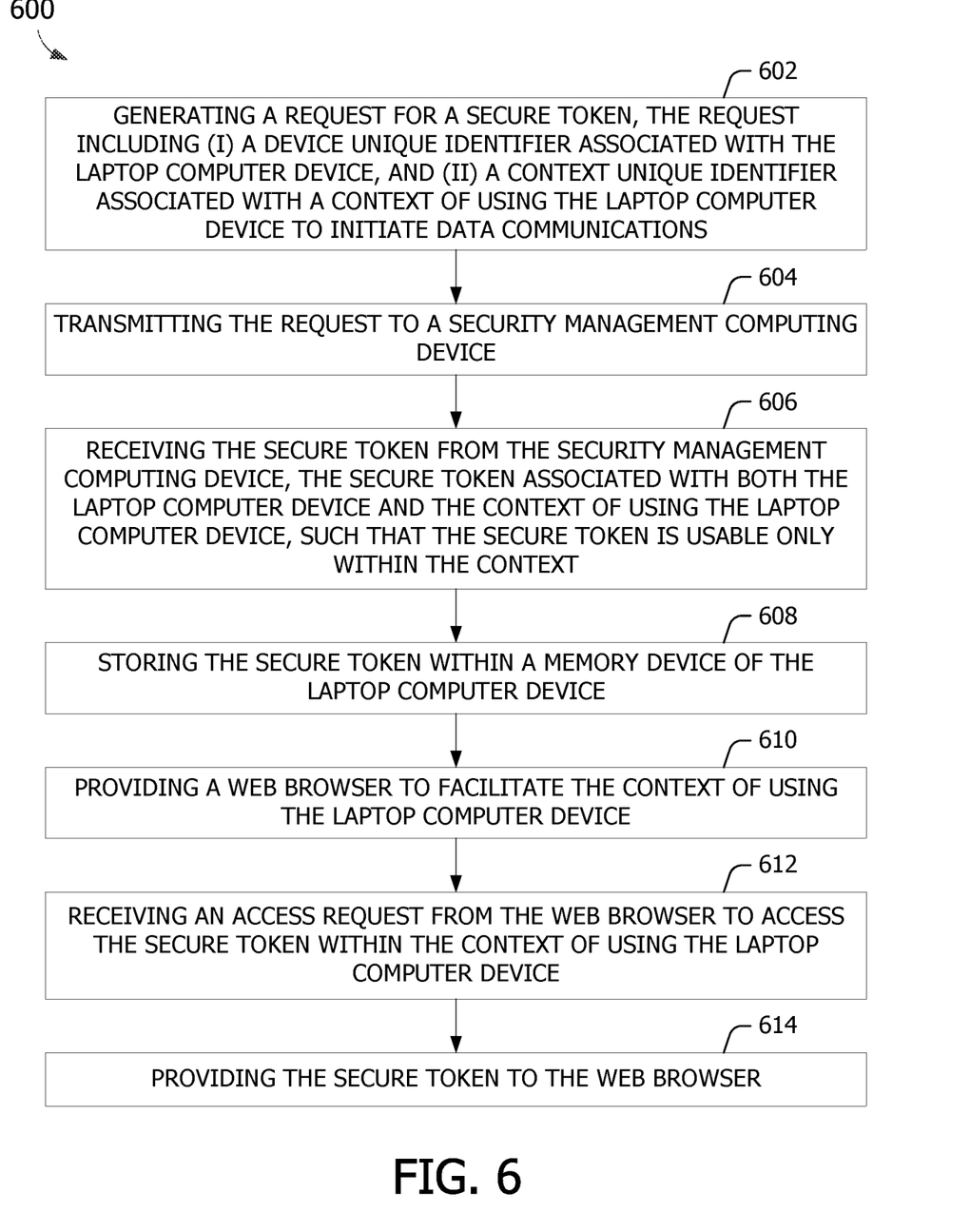
FIG. 6 is a flow diagram of another method for securing a laptop computer device using the system shown in FIG. 1.

FIG. 6 is a flow diagram of a method 600 for securing a laptop computer device, such as laptop computer device 110 (shown in FIG. 1). Method 500 is implemented using device security computer system 100 (also shown in FIG. 1), specifically using laptop computer device 110.

Method 600 includes generating 602 a request for a secure token, the request including (i) a device unique identifier associated with the laptop computer device, and (ii) a context unique identifier associated with a context of using the laptop computer device to initiate data communications. Method 600 also includes transmitting 604 the request to a security management computing device, and receiving 606 the secure token from the security management computing device, the secure token associated with both the laptop computer device and the context of using the laptop computer device, such that the secure token is usable only within the context. Method 600 further includes storing 608 the secure token within a memory device of the laptop computer device. Method 600 still further includes providing 610 a web browser to facilitate the context of using the laptop computer device, receiving 612 an access request from the web browser to access the secure token within the context of using the laptop computer device, and providing 614 the secure token to the web browser. It should be readily understood that method 600 may include additional, fewer, and/or alternative steps in one or more embodiments.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is receiving token data, converting the data into a first data file by a processor, converting the first data file to a first waveform by the processor, converting the first waveform into a second waveform for transmission by a transmitter, receiving the second waveform by a key card reading device device, converting the second waveform into a second data file, and authenticating the token data. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

This written description uses examples to illustrate the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for securing a laptop computer device using a security management computing device, the method comprising:
   receiving, from the laptop computer device, a request for a secure token, the request generated by the laptop computer device in response to a user of the laptop computer device initiating the request by interacting with at least one input device of the laptop computer device, the request including (i) a device unique identifier unique to the laptop computer device and associated with one or more hardware components of the laptop computer device, and (ii) a context unique identifier associated with a context of using the laptop computer device to initiate data communications;
   generating a secure token unique to the laptop computer device and the context of using the laptop computer device by generating a hash of the device unique identifier and the context unique identifier, such that the secure token obscures the device unique identifier and the context unique identifier and is usable only within the context; and
   transmitting the secure token to the laptop computer device for storage in a secure area of a memory device of the laptop computer device where the secure token is both secured and available for future use within the context.

2. The method of claim 1 further comprising, in response to receiving the request, authenticating the request before generating the secure token.

3. The method of claim 2, wherein authenticating the request comprises:
   identifying a party associated with at least one of the laptop computer device and the context of using the laptop computer device;
   transmitting a verification request message to the party, the verification request message including an authentication element; and
   receiving the authentication element from the laptop computer device, wherein the authentication element is input by the user into one of the laptop computer device or another user computing device operated by the user.

4. The method of claim 1, wherein receiving a request including a context unique identifier comprises receiving the request including a payment account identifier associated with a payment account of a user of the laptop computer device, wherein the context of using the laptop computer device includes using the laptop computer device to initiate purchase transactions.

5. The method of claim 4 further comprising, in response to receiving the request, authenticating the request before generating the secure token, wherein authenticating the request comprises:
   identifying an issuer of the payment account;
   transmitting a control message to the issuer, the control message including instructions causing the issuer to generate and transmit a verification request message to a user of the payment account, the verification request message including an authentication element; and
   receiving the authentication element from the laptop computer device.

6. A security management computing device for securing a laptop computer device, the security management computing device comprising:
   a memory; and
   a processor in communication with the memory, the processor programmed to:
      receive, from the laptop computer device, a request for a secure token, the request generated by the laptop computer device in response to a user of the laptop computer device initiating the request by interacting with at least one input device of the laptop computer device, the request including (i) a device unique identifier unique to the laptop computer device and associated with one or more hardware components of the laptop computer device, and (ii) a context unique identifier associated with a context of using the laptop computer device to initiate data communications;
      generate a secure token unique to the laptop computer device and the context of using the laptop computer device by generating a hash of the device unique identifier and the context unique identifier, such that the secure token obscures the device unique identifier and the context unique identifier and is usable only within the context; and
      transmit the secure token to the laptop computer device for storage in a secure area of a memory device of the laptop computer device where the secure token is both secured and available for future use within the context.

7. A method for securing a laptop computer device, the method comprising:
   generating, by the laptop computer device, a request for a secure token in response to a user of the laptop computer device initiating the request by interacting with at least one input device of the laptop computer device, the request including (i) a device unique identifier unique to the laptop computer device and associated with one or more hardware components of the laptop computer device, and (ii) a context unique identifier associated with a context of using the laptop computer device to initiate data communications;

transmitting the request to a security management computing device;

receiving the secure token from the security management computing device, the secure token including a hash of the device unique identifier and the context unique identifier and being unique to the laptop computer device and the context of using the laptop computer device, such that the secure token obscures the device unique identifier and the context unique identifier and is usable only within the context;

storing the secure token within a memory device of the laptop computer device;

providing a web browser to facilitate the context of using the laptop computer device;

receiving an access request from the web browser to access the secure token within the context of using the laptop computer device; and providing the secure token to the web browser.

8. The method of claim 7, wherein generating a request including a context unique identifier comprises generating the request including a payment account identifier associated with a payment account of the user of the laptop computer device, wherein the context of using the laptop computer device includes using the laptop computer device to initiate purchase transactions.

9. The method of claim 8, wherein receiving an access request from the web browser comprises receiving a request to initiate a purchase transaction from the web browser on the laptop computer device, and wherein providing the secure token to the web browser comprises populating at least one field on an active webpage in the web browser with at least a portion of the secure token.

10. The method of claim 7 further comprising:
in response to receiving the access request from the web browser, prompting the user of the laptop computer device to provide user authentication data; and
upon receiving the user authentication data, providing the secure token.

11. The method of claim 7 further comprising:
upon transmitting the request for the secure token, receiving a notification, from the security management computing device, of an authentication of the request;
providing a prompt to the user to enter an authentication element using the at least input device of the laptop computer device; and
transmitting the authentication element to the security management computing device prior to receiving the secure token.

12. The method of claim 7, wherein receiving an access request from the web browser to access the secure token comprises receiving the access request from a plug-in of the web browser.

13. The method of claim 7, wherein receiving an access request from the web browser to access the secure token comprises receiving the access request from the web browser via an API.

14. A laptop computer device comprising:
at least one input device;
a memory device; and
a processor in communication with the memory device, the processor programmed to:
generate a request for a secure token in response to a user of the laptop computer device initiating the request by interacting with the at least one input device of the laptop computer device, the request including (i) a device unique identifier unique to the laptop computer device and associated with one or more hardware components of the laptop computer device, and (ii) a context unique identifier associated with a context of using the laptop computer device to initiate data communications;

transmit the request to a security management computing device;

receive the secure token from the security management computing device, the secure token including a hash of the device unique identifier and the context unique identifier and being unique to the laptop computer device and the context of using the laptop computer device, such that the secure token obscures the device unique identifier and the context unique identifier and is usable only within the context;

store the secure token within a secure memory area of the memory device;

provide a web browser to facilitate the context of using the laptop computer device;

receive an access request from the web browser to access the secure token within the context of using the laptop computer device; and provide the secure token to the web browser.

15. The laptop computer device of claim 14, wherein the context unique identifier includes a payment account identifier associated with a payment account of the user of the laptop computer device, and wherein the context of using the laptop computer device includes using the laptop computer device to initiate purchase transactions.

16. The laptop computer device of claim 15, wherein the processor is further programmed to receive a request to initiate a purchase transaction from the web browser on the laptop computer device, and populate at least one field on an active webpage in the web browser with at least a portion of the secure token.

17. The laptop computer device of claim 14, wherein the processor is further programmed to:
in response to receiving the access request from the web browser, prompt the user of the laptop computer device to provide user authentication data using the at least one input device of the laptop computer device; and
upon receiving the user authentication data, provide the secure token.

18. The laptop computer device of claim 14, wherein the processor is further programmed to:
upon transmitting the request for the secure token, receive a notification, from the security management computing device, of an authentication of the request;
provide a prompt to the user to enter an authentication element using the at least one input device of the laptop computer device; and
transmit the authentication element to the security management computing device prior to receiving the secure token.

19. The laptop computer device of claim 14, wherein the processor is further programmed to receive the access request from at least one of a plug-in of the web browser and an API.

20. The laptop computer device of 14, wherein the device unique identifier is associated with one of a processor, integrated circuit, chip, or network interface controller of the laptop computer device.

* * * * *